United States Patent [19]

Ohno et al.

[11] 3,940,121

[45] Feb. 24, 1976

[54] METAL VAPOR-TRAPPING SYSTEM

[75] Inventors: Masayoshi Ohno; Osamu Ozaki, both of Yokohama, Japan

[73] Assignee: Tokyo Shibaura Electric Co., Ltd., Kawasaki, Japan

[22] Filed: Sept. 24, 1973

[21] Appl. No.: 399,919

[30] Foreign Application Priority Data

Sept. 26, 1972 Japan............................. 47-96505

[52] U.S. Cl................................................ 266/15
[51] Int. Cl............................................ C21b 61/00
[58] Field of Search...... 75/88; 165/105; 176/19 LD, 176/37, 65; 266/15, 16, 19

[56] References Cited
UNITED STATES PATENTS

| | | | |
|---|---|---|---|
| 1,271,560 | 7/1918 | Fulton................... | 266/19 |
| 1,955,964 | 4/1934 | Kemmer............... | 266/15 |
| 2,381,405 | 8/1945 | Griswold............... | 266/19 |
| 2,416,992 | 3/1947 | Griswold et al....... | 75/66 |
| 3,222,255 | 12/1965 | Maldague.............. | 176/65 |
| 3,578,563 | 5/1971 | Strohmeyer........... | 176/65 |

*Primary Examiner*—Gerald A. Dost
*Attorney, Agent, or Firm*—Oblon, Fisher, Spivak, McClelland & Maier

[57] ABSTRACT

A metal vapor-trapping system wherein a gaseous mixture containing vapors of liquid metal is conducted from a tank to a first device, where the gas is cooled to trap most of the metal vapors contained therein by condensing said vapors into a liquid form; the gaseous mixture is further delivered to a second device, where the gas is cooled to a lower temperature than the solidifying point of said liquid metal to trap residual metal vapors in the solidified form; a gas free from said metal vapors is discharged from the second device; and a liquid metal obtained by being condensed from its vaporized form in the first device is automatically brought back to the tank by valve control.

6 Claims, 3 Drawing Figures

METAL VAPOR-TRAPPING SYSTEM

BACKGROUND OF THE INVENTION

This invention relates to a metal vapor-trapping system which comprises cooling a gaseous mixture containing vapors of liquid metal, thereby trapping, said metal vapors by condensation and solidification.

Devices in common use for removing vapors of liquid metal from a gaseous mixture by cooling include a condensation type which traps metal vapors by condensation into a liquid form and a solidification type which traps metal vapors by solidification. The condensation type trapping device which simply consists in condensing metal vapors can be operated continuously for long hours by properly adjusting the liquefying rate through control of cooling temperature, but has the drawback that metal vapors can not be fully eliminated, namely, said trapping is carried out inefficiently. On the other hand, the solidification type trapping device can indeed attain a substantially 100% removal, but is accompanied with the shortcoming that the period of its continuous operation is short. The reason is that the solidification type trapping device is so designed as to cool metal vapors for solidification and deposit solidified metal on packing acting as a filter, and that the packing having a limited volume of deposition quickly has its meshes plugged with solid deposits of metal when a large amount of metal vapors is introduced into said device, failing to be used any longer.

As mentioned above, no satisfactory metal vapor-trapping device has been developed which attains said trapping at a high rate and can be operated continuously for long hours.

Such a metal vapor-trapping apparatus is applied, for example, in the case where it is desired to trap vapors of molten lithium carried into argon gas or vapors of molten aluminium brought into nitrogen gas.

Particularly in recent years, where detection is to be made of any failing fuel rod in a nuclear reactor using liquid metal, for example, molten sodium as a coolant, it is necessary to trap vapors of molten sodium carried into the inert gas, for example, argon gas enveloping active molten sodium. Detection of a failing fuel rod is carried out by sampling said inert gas enveloping the active molten sodium used as a coolant in a liquid metal coolant reactor to determine whether or not said inert argon gas contains fission products, for example, krypton (Kr) and xenon (Xe). The molten sodium used as a coolant is generally heated to about 500°C in the nuclear reactor, so that the inert argon gas enveloping the molten sodium is unavoidably contaminated with its vapors. Therefore, sampling of such argon gas for detection of any failing fuel rod simultaneously collects the vapors of the molten sodium. However, said vapors are already activated and moreover display electric conductivity when condensed or solidified, thus exerting a harmful effect on a detecting device. It is therefore necessary to trap in advance the vapors of the molten sodium carried into the argon gas. This necessity also occurs with the cask-car of a fuel handling mechanism included in a nuclear reactor system. Namely, the vapors of molten sodium deposited on the surface of a spent fuel rod is carried into the argon gas enveloping said molten sodium. And the vapors of molten sodium are collected in a gas circulation system, giving rise to various harmful effects. Accordingly, the cask-car should be provided with a device for trapping the vapors of molten sodium carried into the argon gas.

Summary of the Invention

The metal vapor-trapping system of this invention causes a gaseous mixture containing the vapors of liquid metal to be first conducted to a condensation type trapping device where the gaseous mixture is cooled by temperature controlling means included in said device. As the result, substantially all the vapors of the molten metal contained in the gaseous mixture are removed in the liquefied form to be collected in said condensation device. A gaseous mixture discharged therefrom is next conducted to a solidification type trapping device, where the gaseous mixture is cooled to a lower temperature than the solidification point of the vapors of the molten metal by temperature controlling means included in said solidification device. Accordingly, an extremely small amount of the vapors of the molten metal still remaining in the gaseous mixture is fully trapped in the solidified form to be collected in said solidification device. A gas released therefrom is quite free from the vapors of the molten metal and put to various applications in the purified form. The metal vapor-trapping system of this invention is further provided with a passageway through which to return the liquefied metal collected in the condensation type trapping device to the original tank, said passageway being fitted with a valve controlling device for its proper operation.

It is accordingly an object of this invention to provide a metal vapor-trapping system capable of very efficiently trapping the vapors of liquid metal from a gaseous mixture and being operated continuously for long hours.

Another object of the invention is to provide a metal vapor-trapping system capable of automatically returning the vapors of liquid metal condensed by the condensation device to the tank very quickly and unfailingly.

Further objects of the invention will be clearly understood from the description of the preferred embodiment and the appended drawings.

DESCRIPTION OF THE PREFERRED EMBODIMENT

Figure 1:
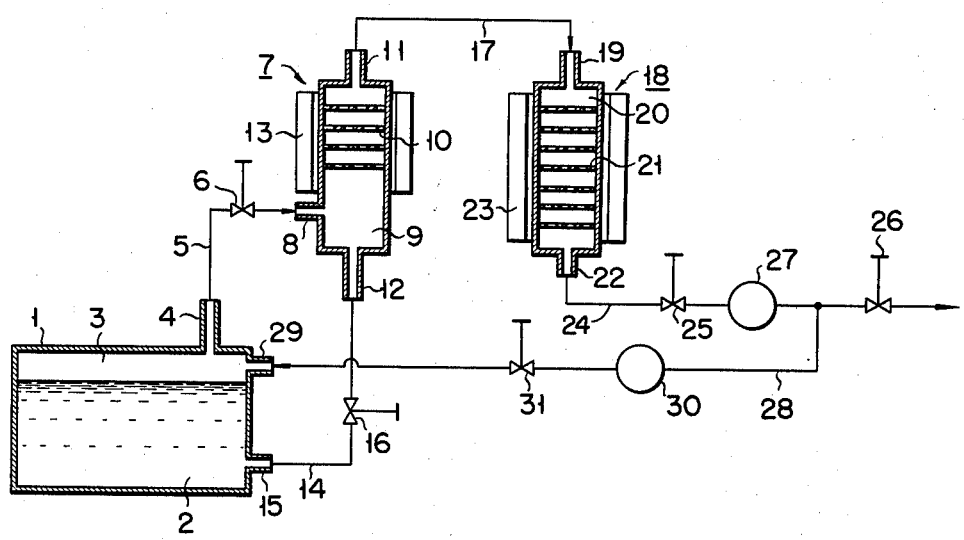
FIG. 1 is a schematic illustration of the entire arrangement of the preferred embodiment of this invention.

FIG. 1 relates to the case where the vapors of molten sodium carried into a gaseous mixture containing argon gas are trapped by the metal vapor-trapping system of this invention.

Figure 2:
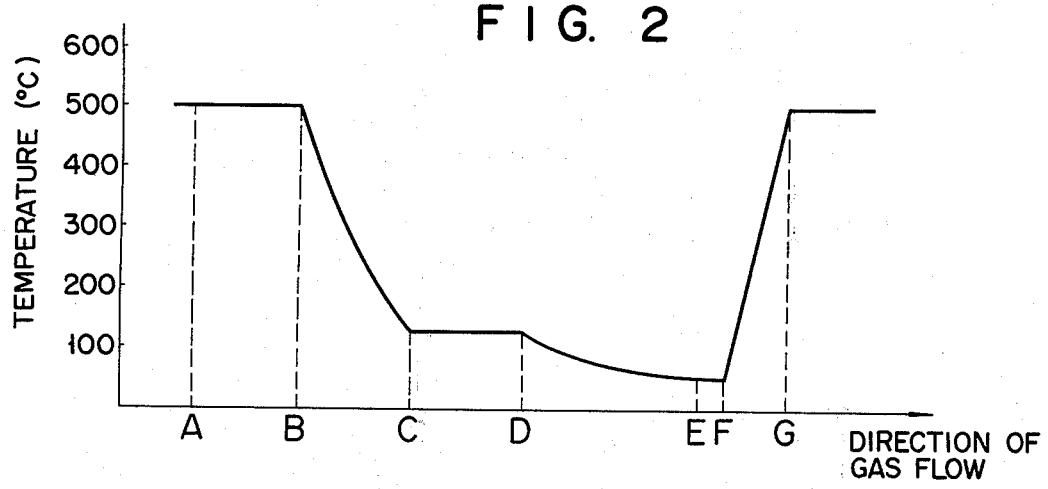
FIG. 2 shows the distribution of temperatures of the various parts of the preferred embodiment of FIG. 1.

Received in a tank 1 is molten sodium heated to about 500°C with a small space 3 allowed in the upper portion of the tank 1. This space 3 is filled with argon gas. Collected in the space 3 is a gaseous mixture consisting of argon gas and the vapors of molten sodium. The space 3 of the tank 1 communicates with one end of a conduit 5 through a gas outlet 4. The conduit 5 is fitted with a valve 6. The other end of the conduit 5 is connected to the gas inlet 8 of a vertically positioned condensation device 7. When the valve 6 is opened, a gaseous mixture collected in the space 3 of the tank 1 is conducted through the conduit 5 into the condensation device 7, in the space of which there are superposed a plurality of perforated sieve plates 10 at a prescribed interval in the vertical direction. These perforated plates 10 may be replaced by wire nets, or packing members such as rasching rings. The upper part of the space 9 is fitted with a gas outlet 11 and the lower part thereof with a liquid outlet 12. The condensation device 7 is further provided with a temperature controlling device 13 for causing temperature prevailing in the space 9 fitted with perforated sieve plates 10 to present such a gradient as progressively falls from the gas inlet 8 to the gas outlet 11. The temperature controlling device 13 consists of a cooler and fan. Said temperature controlling device 13 controls temperature such that as shown in FIG. 2, temperature progressively falls from the gas inlet 8 to the gas outlet 11, so as to stand at about 130°C a little higher than the solidification point (97.7°C) of molten sodium. The liquid outlet 12 is connected to the liquid return port 15 of the tank 1 through a conduit 14 fitted with a valve 16.

The gas outlet 11 is connected through a conduit 17 to the gas inlet 19 of a solidification device 18. The conduit 17 is provided with jacketing means including a heater so as to prevent, as shown in FIG. 2, the gaseous mixture drawn out of the gas outlet 11 from being decreased in temperature until it reaches the gas inlet 19 of the solidification device 18. In the space 20 of said device 18 a plurality of filters 21 are superposed at a prescribed interval. Provided at the lower part of the space 20 is a gas outlet 22. The solidification device 18 is further fitted with a temperature controlling device 23 consisting of a cooler and fan so as to control temperature prevailing in the space 20. Said temperature controlling device 23 carries out cooling such that as shown in FIG. 2, temperature gradually falls from the gas inlet 19 to the gas outlet 22 and that a gaseous mixture at the gas outlet 22 indicates a lower temperature than the solidification point (97.7°C) of molten sodium.

The gas outlet 22 is connected to a discharge conduit 24, which is provided with valves 25 and 26 and a suction pump 27 disposed between these valves 25 and 26. A return conduit 28 is connected at one end to the intermediate part of the discharge conduit 24 and at the opposite end to the gas return port 29 of the tank 1. The return conduit 28 is fitted with a heater 30 and valve 31. The gas return port 29 communicates with the space 3 of the tank 1. The heater 30 serves, as shown in FIG. 2, to raise the temperature of a gaseous mixture carried from the discharge conduit 24 to the return conduit 28 to about 500°C substantially equal to the temperature prevailing in the tank 1.

There will now be described the process of fully trapping the vapors of molten sodium received in the tank 1 from a gaseous mixture consisting of argon gas and said vapors by conducting said mixture through the condensation device 7 and solidification device 18.

First, the valves 16 and 31 are set at the closed position and the valves 6, 25 and 26 at the open position. The temperature controlling device 13 of the condensation device 7 is operated to cool said device 7. Also the temperature controlling device 23 of the solidification device 18 is actuated to cool said device 18. When the suction pump 27 is driven, then a gaseous mixture consisting of argon gas and vapors of molten sodium collected in the space 3 of the tank 1 is delivered to the condensation device 7 through the conduit 5 by the suction pump 27. While passing through the perforated sieve plates 10, the vapors of molten sodium are gradually condensed into liquid by the cooling action of the temperature controlling device 13. The molten sodium now liquefied by condensation drips to the bottom of the space 9 of the condensation device 7 to be collected therein. When the gaseous mixture is brought to the gas outlet 11, substantially all the vapors of the molten sodium contained in said mixture are liquefied by condensation. Therefore, a gaseous mixture leaving the gas outlet 11 contains an extremely small amount of molten sodium vapors.

Thereafter, the gaseous mixture is introduced into the solidification device 18 at the gas inlet 19. The gaseous mixture is cooled by the cooling action of the temperature controlling device 23 to a lower temperature than the solidification point (97.7°C) of molten sodium. While, therefore, flowing through the superposed filters 21 provided in the space 20 of the solidification device 18, the vapors of molten sodium still remaining in the gaseous mixture are solidified into fine particle and deposited on the filters 21. As the result, a gas leaving the gas outlet 22 only consists of argon gas quite free from the vapors of molten gas. The argon gas thus purified is discharged to the outside through the discharge conduit 24 to be used in various applications.

As mentioned above, the vapors of molten sodium can be trapped at a prominently high rate by conducting a gaseous mixture collected in the tank 1 which consists of argon gas and said vapors through two types of trapping devices 7 and 18. The results of concrete tests are presented in Tables 1 and 2 below.

Table 1

| | | Tests of trapping metal vapors using a condensation type trapping device | | | |
|---|---|---|---|---|---|
| Inlet gas temperature (°C) | Inlet gas flow rate (Nl/min) | Sodium concentration in inlet gas ($\mu$g/Nl) | Outlet gas temperature (°C) | Sodium Concentration in outlet gas ($\mu$g/Nl) | Rate of trapping sodium vapors (%) |
| | | 993 | 131 | 0.06 | Over 99.9 |
| | | | | 0.07 | Over 99.9 |
| | | | | 0.06 | Over 99.9 |
| 510 | 140 | 1013 | 148 | 0.06 | Over 99.9 |
| | | | | 0.08 | Over 99.9 |
| | | 1118 | 160 | 0.08 | Over 99.9 |

Table 2

Tests of trapping metal vapors using a solidification type trapping device

| Inlet gas temperature (°C) | Inlet gas flow rate (Nl/min) | Sodium concentration in inlet gas (μg/Nl) | Outlet gas temperature (°C) | Sodium Concentration in outlet gas (μg/Nl) | Rate of trapping sodium vapors (%) |
| --- | --- | --- | --- | --- | --- |
|  |  | 0.08 |  | * | 100 |
|  |  | 0.06 |  | * | 100 |
| 140 | 140 | 0.09 | 50 | * | 100 |
|  |  | 0.08 |  | 0.01 | 88 |
|  |  | 0.15 |  | 0.01 | 93 |
|  |  | 0.10 |  | * | 100 |

* Lower concentrations than the detection limit permitting the analytical operation of the metal vapor-trapping system of this invention.

When the vapors of molten sodium are continuously separated from the argon gas in the condensation device 7, the vapors are gradually collected in said device 7 by being liquefied by condensation. When the valve 16 is opened, the liquefied molten sodium vapors are returned to the tank 1.

There will now be described the circuit of FIG. 3 for controlling the operation of said return valve 16.

Figure 3:
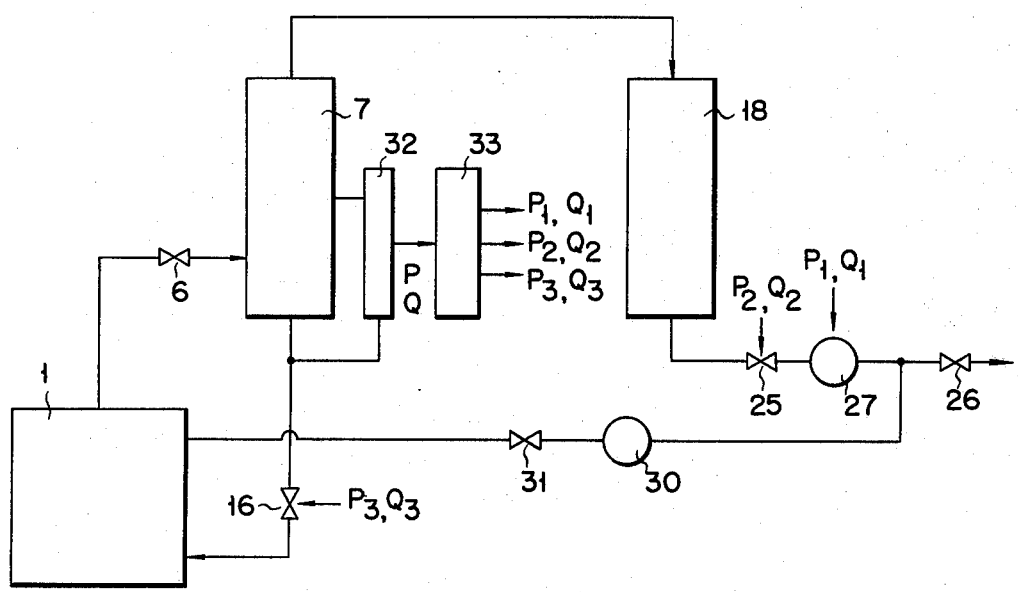
FIG. 3 is a schematic circuit diagram illustrative of the operation of a valve controlling device included in the preferred embodiment of FIG. 1.

The condensation device 7 is further provided with a liquid level gauge 32, shown in FIG. 3, though not in FIG. 1, for detecting the amount of liquefied sodium vapors collected in said device 7. Said liquid level gauge 32 is designed to detect whether the level of the liquefied sodium vapors collected in the condensation device 7 reached the upper or lower limit and supply a detection signal to a control signal generator 33. This control signal generator 33 which is shown in FIG. 3, though not in FIG. 1, may be disposed at any suitable part of the subject metal vapor-trapping system.

When the amount of collected liquefied sodium vapors rises to the upper limit on the liquid level gauge 32, said gauge 32 transmits a signal P to the control signal generator 33, which in turn gives forth control signals $P_1$, $P_2$ and $P_3$. The control signal $P_1$ stops the suction pump 27, the control signal $P_2$ closes the valve 25, and the control signal $P_3$ opens the return valve 16. The opening of this return valve 16 is effected with such a prescribed time delay as to be preceded by the stop of the suction pump 27 and the closing of the valve 25. The above-mentioned control operation causes the liquefied sodium vapors collected in the condensation device 7 to be brought back to the tank 1 through the return conduit 14.

As the return of liquefied sodium vapors proceeds, the liquid level gauge indicates a lower liquid level, and, when the level reaches the lower limit, supplies the control signal generator 33 with a signal Q showing that said lower limit has been reached. At this time, the generator 33 gives forth control signals $Q_1$, $Q_2$ and $Q_3$. The control signal $Q_1$ drives again the suction pump 27 stopped up to this point. The control signal $Q_2$ changes the condition of the valve 25 from "closed" to "open". The control signal $Q_3$ changes the condition of the return valve 16 from "open" to "closed". In this case, the drive of the suction pump 27 and the opening of the valve 25 are carried out with a prescribed time delay from the closing of the return valve 16.

Since the liquefied sodium vapors collected in the condensation device 7 are automatically controlled to return to the tank 1, said condensation device 7 can be continuously operated, eliminating an operator's troublesome work of watching the collected amount of the liquefied sodium vapors from time to time.

The other valves 2, 26 and 31 of the subject metal vapor-trapping system which are not included in the above-mentioned automatic control system can be opened or closed at the discretion of an operator. As apparent from the previously given Table 2, only an extremely small amount of free sodium vapors is contained in a gaseous mixture conducted to the solidification device 18 after most of the vapors originally contained in the mixture has already been trapped by liquefaction in the condensation device 7. Accordingly, the amount of sodium vapors collected in the solidified form in the solidification device 18 is considerably minute. It will, therefore, be a long time before the filters 21 are so much plugged with the solid deposits of sodium as to necessitate their replacement. This means that the metal vapor-trapping system of this invention can be operated continuously for long hours under a stable condition. Obviously, plugged fiters 21 should be taken out of the solidification device 18 for replacement.

Where it is desired to bring purified argon gas delivered to the discharge condiut 24 further back to the tank 1, it is advised to open the valve 31 and close the valve 26. Where part of the purified argon gas is to be applied for other objects than that for which the gas is primarily intended, it is possible to open both valves 31 and 26.

It will be noted that the metal vapor-trapping system of this invention is not limited to the foregoing embodiment, but may be applicable in the undermentioned modifications.

a. The conduit 5 connecting the tank 1 with the condensation device 7 may be made not only to deliver a gaseous mixture containing vapors of molten metal to said condensation device 7, but also concurrently to act as a conduit for discharging metal vapors liquefied by condensation in said device 7. In such case, the discharge conduit 14 used in the preferred embodiment may be omitted.

b. The tank 1 may be provided with a pump to raise pressure in the space 3 thereof for delivery of a gaseous mixture to the condensation device 7. In such case, the suction pump 27 of the preferred embodiment will be unnecessary.

c. According to the preferred embodiment, both condensation and solidification devices 7 and 18 take an upright position. However, these devices 7 and 18 may be disposed horizontally. It is also possible to combine both devices into an integral body.

d. The liquid level gauge 32 and control signal generator 33 used with the condensation device 7 may be replaced by a timer, thereby actuating the valves 16 and 25 and suction pump 27 at a prescribed interval so as to control the discharge of liquefied sodium vapors collected in the condensation device 7.

e. A coolant used in the temperature controlling devices 13 and 23 included in the condensation and solidification devices 7 and 18 may consist of a gaseous or liquid material. Further to provide a proper temperature gradient, an electric heater may sometimes be usable.

f. The valves 6, 25, 26 and 31 fitted to various parts of the preferred embodiment may be omitted, depending on the conditions under which the metal vapor-trapping system of this invention is operated.

g. The liquefied molten sodium vapors collected in the condensation device 7 may be returned to a separate recovery tank instead of the tank 1 as practised in the embodiment.

h. The tank 1 of this embodiment holds liquid metal, and a gaseous mixture consisting of vapors of said liquid metal and another gas. It will be understood that the term "tank", as used herein, includes a combination of a tank only holding liquid metal and another tank communicating therewith so as to receive the aforesaid gaseous mixture. Further, said tank may possibly be a nuclear reactor.

As mentioned above, the metal vapor-trapping system of the invention enables only the metal vapors carried into a gaseous mixture to be trapped almost completely and is further operable continuously for long hours, attaining a higher efficiency of eliminating metal vapors and a longer effective life than is possible with the prior art device.

What we claim is:

1. A metal vapor-trapping system for trapping vapors of liquid metal from a gaseous mixture consisting of said vapors and another gas which comprises:
   a tank for holding a liquid metal heated to a prescribed temperature and a gaseous mixture consisting of vapors of said liquid metal and said another gas;
   a first conduit connected at one end to the gas outlet of the tank;
   a condensation device provided with a gas inlet connected to the other end of the first conduit, a gas outlet, and a liquid outlet, and provided with a plurality of packing members for progressively decreasing the temperature of said gaseous mixture from the gas inlet to the gas outlet and thereby trap substantially all of the metal vapors contained in the gaseous mixture by condensing the vapors into liquid;
   first temperature control means associated with said condensation device for controlling the temperature of said gaseous mixture such that even when cooled, the gaseous mixture has its temperature near the gas outlet maintained at a higher level than the solidification point of the liquid metal;
   a solidification device having a gas inlet and a gas outlet, and provided with a plurality of filters for progressively decreasing the temperature of said gaseous mixture conducted from said condensation device and passing through said filters from said gas inlet toward said gas outlet;
   second temperature control means associated with said solidification device for controlling the temperature of said gaseous mixutre and for reducing said temperature of said gaseous mixture to a lower temperature level than the solidification point of the liquid metal so as to thereby solidify the small amount of metal vapors still remaining in the gaseous mixture, said solidified vapors being separated and deposited upon said filters within said solidification device; and
   a second conduit connected at one end to the gas outlet of said solidification device so as to conduct a gas substantially free from metal vapors which has been drawn out through the gas outlet.

2. A metal vapor-trapping system according to claim 1 wherein the liquid metal is molten sodium and one component of the gaseous mixture is argon gas.

3. A metal vapor-trapping system according to claim 1, which further comprises:
   a first valve disposed within said second conduit;
   a third conduit connected at one end thereof to the second conduit at a position upstream of said first valve and at the other end thereof to the tank whereby upon closing of said first valve, said gas free from metal vapor which has been delivered to the second conduit through the gas outlet of the solidification device may be returned to said tank;
   heating means disposed within the third conduit so as to heat the gas being returned to the tank up to a prescribed temperature prevailing in a tank; and
   a second vlve provided on the third conduit for controlling the flow rate of said gas running through said conduit.

4. A metal vapor-trapping system for trapping vapors of liquid metal from a gaseous mixture consisting of said vapors and another gas which comprises:
   a tank for holding a liquid metal heated to a prescribed temperature and a gaseous mixture consisting of vapors of said liquid metal and said another gas;
   a first conduit connected at one end to the gas outlet of the tank;
   a condensation device provided with a gas inlet connected to the other end of the first conduit, a gas outlet, and a liquid outlet, and provided with a plurality of packing members for progressively decreasing the temperature of said gaseous mixture from the gas inlet to the gas outlet and thereby trap substantially all of the metal vapors contained in the gaseous mixture by condensing the vapors into liquid;
   first temperature control means associated with said condensation device for controlling the temperature of said gaseous mixture such that even when cooled, the gaseous mixture has its temperature near the gas outlet maintained at a higher level than the solidification point of the liquid metal;
   a second conduit connected between the liquid outlet of said condensation device and said tank so as to return to the tank the metal vapors liquefied by condensation in said condensation device;
   a first valve provided on the second conduit for controlling the return flow of the liquefied metal vapors to the tank;
   a third conduit connected at one end to the gas outlet of said condensation device;
   a solidification device having a gas inlet connected to the other end of the third conduit, and a gas outlet, and provided with a plurality of filters for progressively decreasing the temperature of said gaseous mixture conducted from said condensation device and passing through said filters from said gas inlet toward said gas outlet;

second temperature control means associated with said solidification device for controlling the temperature of said gaseous mixture and for reducing said temperature of said gaseous mixture to a lower temperature level than the solidification point of the liquefied metal so as to thereby solidify the small amount of metal vapors still remaining in the gaseous mixture, said solidified vapors being separated and deposited upon said filters within said solidification device;

a fourth conduit connected at one end thereof to the gas outlet of the solidification device so as to conduct a gas substantially free from metal vapors which has been drawn out through the gas outlet;

a second valve provided within the fourth conduit for controlling the flow of said gas free of said metal vapors through said conduit;

a suction pump so driven as to conduct the gaseous mixture held in the tank to the condensation and solidification devices;

a detection means for detecting the upper and lower limits reached by the amount of metal vapors liquefied by condensation and collected in the condensation device and, when either limit is reached, generating a signal denoting this event;

a control signal generator connected to said detection means so as to be supplied with an output signal therefrom and so designed as to generate, upon receipt of an upper limit signal from the detection means, such a control signal as to close the second valve, deactivate the suction pump and thereafter open the first valve, thereby returning the liquid metal from the condensation device to the tank, and to generate, upon receipt of a lower limit signal from the detection means, such a control signal as to close the first valve and thereafter open the second valve and actuate the suction pump, thereby obstructing the return flow of the liquid metal from the condensation device to the tank.

5. A metal vapor-trapping system according to claim 4 wherein the liquid metal is sodium and one component of the gaseous mixture is argon gas.

6. A metal vapor-trapping system according to claim 4, which further comprises:

a third valve disposed within said fourth conduit;

a fifth conduit connected at one end thereof to the fourth conduit at a position upstream of said third valve and at the other end thereof to the tank, whereby upon closing of said third valve, said gas free from metal vapors which has been conducted to the fourth conduit through the gas outlet of the solidification device;

heating means provided within the fifth conduit so as to heat the gaseous mixture being returned to the tank up to a prescribed temperature prevailing in the tank; and a fourth valve provided within the fifth conduit so as to control the flow rate of the gaseous mixture running through the fifth conduit.

* * * * *